(12) United States Patent
Cocks et al.

(10) Patent No.: US 6,912,714 B1
(45) Date of Patent: Jun. 28, 2005

(54) FINDING NAMED COLLECTIONS VIA LIFE CYCLE INTERFACES

(75) Inventors: Stephen James Cocks, Bournemouth (GB); Russell Ley Newcombe, Round Rock, TX (US); Lori Milhans VanGulick, Cedar Park, TX (US); David Joseph Wisneski, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 09/605,779

(22) Filed: Jun. 28, 2000

(51) Int. Cl.$^7$ .............................................. G06F 15/163
(52) U.S. Cl. ...................................................... 719/310
(58) Field of Search .......................... 709/310; 719/310

(56) References Cited

U.S. PATENT DOCUMENTS

| | | | | |
|---|---|---|---|---|
| 5,948,021 A | * | 9/1999 | Radcliffe ...................... | 623/44 |
| 5,948,072 A | * | 9/1999 | Cink et al. ................... | 709/330 |
| 6,016,514 A | * | 1/2000 | Cink et al. ................... | 709/315 |
| 6,418,447 B1 | * | 7/2002 | Frey et al. ............... | 707/103 R |
| 6,510,450 B1 | * | 1/2003 | Ricart et al. ................. | 709/203 |

OTHER PUBLICATIONS

Chevron, Sample Data Types, Apr. 15, 1998.*
BEA Weblogic Enterprise 4.2, FactoryFinder Interface, Jul. 1, 1999, p. 1–14.*
Sun, Enterprise JavaBeans TM to Corba Mapping, 1999.*
CORBAservice , Life Cycle Service Specification, 1999, p. 1–31.*

* cited by examiner

*Primary Examiner*—Thomas Lee
*Assistant Examiner*—Lechi Truong
(74) *Attorney, Agent, or Firm*—David A. Mims, Jr.; Robert V. Wilder

(57) ABSTRACT

A method and implementing system are provided in which CORBA (Common Object Request Broker Architecture) Life Cycle Service factory finding capabilities are utilized by a CORBA Query Service query evaluator to find queriable collections using simple names. The Life Cycle Service, using the simple name, searches a distributed object oriented environment for both Home and non-Home collections. Means are also provided to make known to Life Cycle Services, the queriable collections which are not also Homes.

20 Claims, 7 Drawing Sheets

FINDING NAMED COLLECTIONS VIA LIFE CYCLE INTERFACES

FIELD OF THE INVENTION

The present invention relates generally to information processing systems and more particularly to a methodology and implementation for finding references to objects in a distributed object-oriented network environment.

BACKGROUND OF THE INVENTION

The development of application and system software for information processing systems has traditionally been a time-consuming and somewhat repetitive task, with software developers often having to write and re-write code to perform well known user interface and system functions in addition to writing the code optimized to implement the desired new functionality. Object-oriented programming (OOP) has emerged as a dominant programming paradigm that enables the rapid development and implementation of functionality while permitting the customization and re-use of software "objects".

The power of OOP as a software development philosophy is realized chiefly through object frameworks which provide a collection of base object classes that can be selectively utilized by a system developer to create a software system, much like a hardware developer might construct a desktop computer from standard hardware components. Object frameworks are particularly advantageous when utilized within a distributed computing environment in which multiple, and possibly heterogeneous or dissimilar computer systems are interconnected to allow system hardware and software resources to be shared between computer systems. In order to permit programs written in multiple diverse languages to utilize object classes defined within a single object framework, it is necessary to develop a minimum level of object standardization to enable the inter-operability of object-oriented software. One organization that is working to establish industry guidelines and object management specifications to provide a common object framework for application development is the Object Management Group (OMG).

The specifications promulgated by the OMG enable the reusability, portability and interoperability of object-based software in heterogeneous distributed computing environments. An example of a commercially available object framework that conforms to OMG specifications is contained in the WebSphere Enterprise Edition Component Broker Version 3.0, available from International Business Machines Corporation.

The OMG is an international consortium of organizations involved in various aspects of client/server computing on heterogeneous platforms such as shown in FIG. 1. The OMG has set forth published standards by which clients communicate with objects running in servers. As part of these standards, an Object Request Broker has been defined as part of the Common Object Request Broker Architecture (CORBA). CORBA defines the object-oriented bridge between the client and the server. The object request broker (ORB) de-couples the client and server applications from the object-oriented implementation details.

The OMG defines industry standards for use in CORBA ORB environments in a document referred to as "CORBAservices: Common Object Services Specification", which is included herein by reference. Such service specifications include, inter alia, a "Naming Service" Specification 97-12-10, "Life Cycle Service" Specification 97-12-13, and a "Query Service" Specification 97-12-18.

Objects within a CORBA ORB environment are referenced using an Interoperable Object Reference (IOR). An IOR is only understood by ORB implementations and its contents are opaque to the user of the distributed object-oriented environment. The Naming Service allows objects to be located in the distributed object-oriented environment using human understandable and readable names, by providing a means to obtain the required IOR through the use of the name. The Naming Service defines a hierarchical mechanism for naming objects, with NamingContext objects and bindings to leaf node objects, similar to directories and files in a computers file system. Again, similar to a file system, a name must be unique within a NamingContext but different NamingContexts can contain identical names. Thus, there is a concept of a simple name (within a NamingContext) and a fully qualified name that contains the complete path within the naming system.

In CORBA-compliant systems, the Query Service allows SQL query statements to be processed over queriable collection objects, where the collections are identified by a simple name in a Structured Query Language (SQL) expression. With no further qualification for finding the collection than a simple name, an implementation of a Query Service could only allow for queries over collections at some fixed location in the distributed environment. For example, the QueryEvaluator would use some predefined Naming Context in which it would locate collections by simple name (e.g. a Naming Context representing all the collections within a particular server process). However, there was a need to enable the Query Service to work for queries over collections that could be anywhere within a distributed object oriented environment, while still allowing the SQL to only contain a simple name for identifying the collection.

Within the OMG Life Cycle Services standard, a number of object-oriented programming interfaces are defined in support of the creation and destruction of objects within a heterogeneous distributed computing environment. Among the interfaces and terminology found within the OMG Life Cycle Services standard is the "FactoryFinder" interface, which provides a standard service that can be utilized by applications to locate a Factory object, i.e. an object that is used to create instances of other objects, within the heterogeneous distributed computing environment. The Life Cycle Service provides a mechanism for finding factories anywhere in a distributed environment, where the factories are identified by the interface supported by the objects which the factories create. Therefore, FactoryFinders are used to find objects by type rather than by simple or fully qualified names as is done by the Naming Service.

In many object-oriented environments, some collection objects also serve as factories for objects of the type they collect. An example of this would be the Home objects defined in the Component Broker documentation previously mentioned. Thus, Home objects, being both collections and factories, are the target objects to be found by both Query and Life Cycle Services. This introduces the idea that the Life Cycle Service might be used by the Query Service to locate collections rather than using the Naming Service. However, it must be kept in mind that there are also collections which are not homes and which must also be able to be found using the Query Service.

Thus, there is a need for an improved methodology and implementing system which enables the utilization of the Life Cycle Service for finding queriable collections, using

SUMMARY OF THE INVENTION

A method and implementing system are provided in which a Query Service utilizes a Life Cycle Service to find a Collection using a simple name. The Life Cycle Service, using the simple name, searches a distributed object oriented environment for both Home and non-Home collections. The Life Cycle Service is enhanced by storing a mapping, in one embodiment, from simple names which are used by the Query service to identify Homes, to the parameters required by the Life Cycle Service for finding such Homes. In one embodiment, means are also provided to make known to the Life Cycle Service, the queriable collections which are not also Homes.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
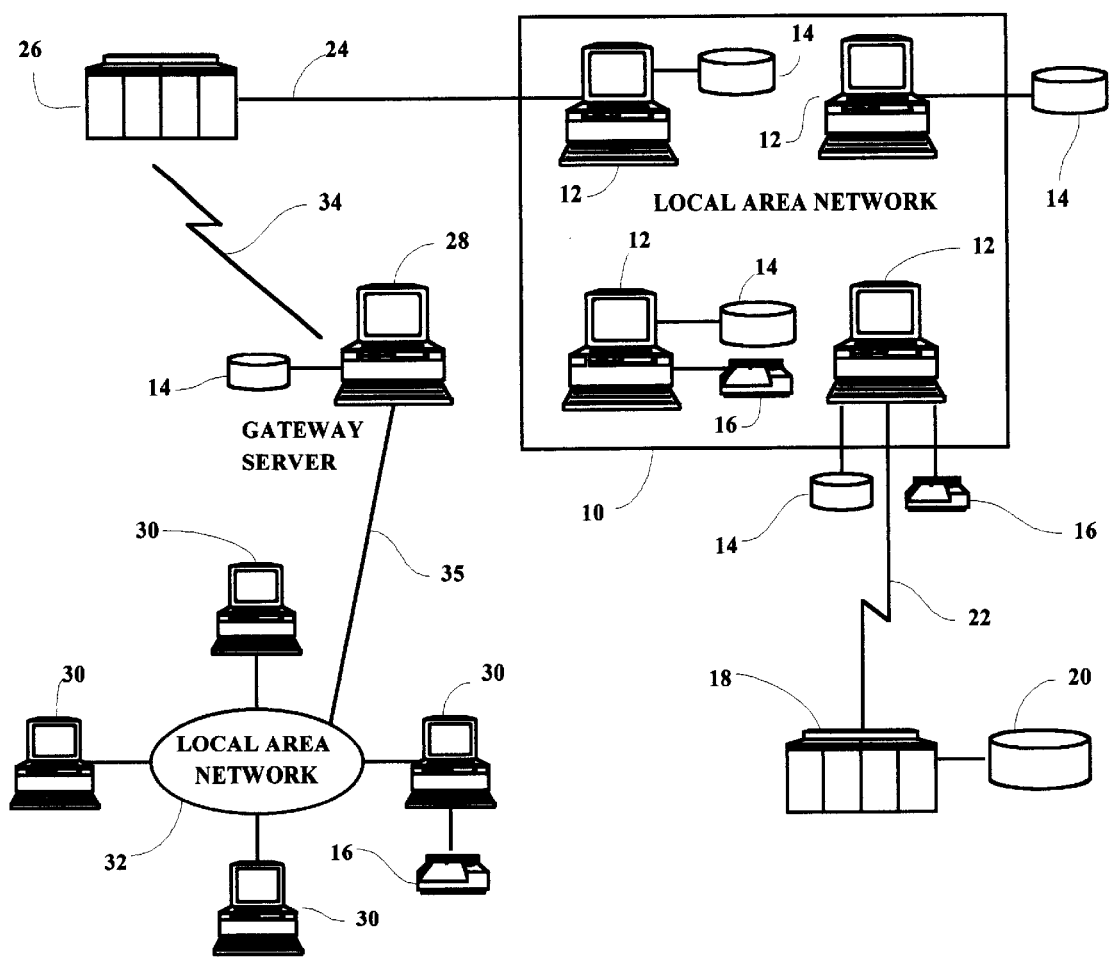
FIG. 1 is an illustrative embodiment of a heterogeneous distributed information processing system in accordance with the present invention.

The various methods discussed herein may be implemented within an exemplary distributed information processing system as illustrated in FIG. 1. As shown, an information processing system contains a plurality of networks including Local Area Networks (LAN) 10 and 32, each of which preferably includes a plurality of individual computers 12 and 30, respectively. One skilled in the art will appreciate that a plurality of workstations coupled to a host processor may be utilized for each such LAN. As is common in such processing systems, each computer 12 and 30, may be coupled to a storage device 14 and a printer 16.

The exemplary processing system further includes one or more mainframe computers, such as mainframe computer 18, which may be preferably coupled to LAN 10 by means of a communications link 22. Mainframe computer 18 is preferably coupled to a storage device 20, which serves as remote storage for LAN 10. LAN 10 is also coupled via communications link 24 through communications controller 26 and communications link 34 to gateway server 28. Gateway server 28 is preferably a workstation which serves to link LAN 32 to LAN 10 via communications link 35. As understood by one skilled in the art, the illustrated processing system further includes un-illustrated additional gateways, routers, bridges and various other network hardware utilized to interconnect the various segments of the exemplary processing system.

Figure 2:
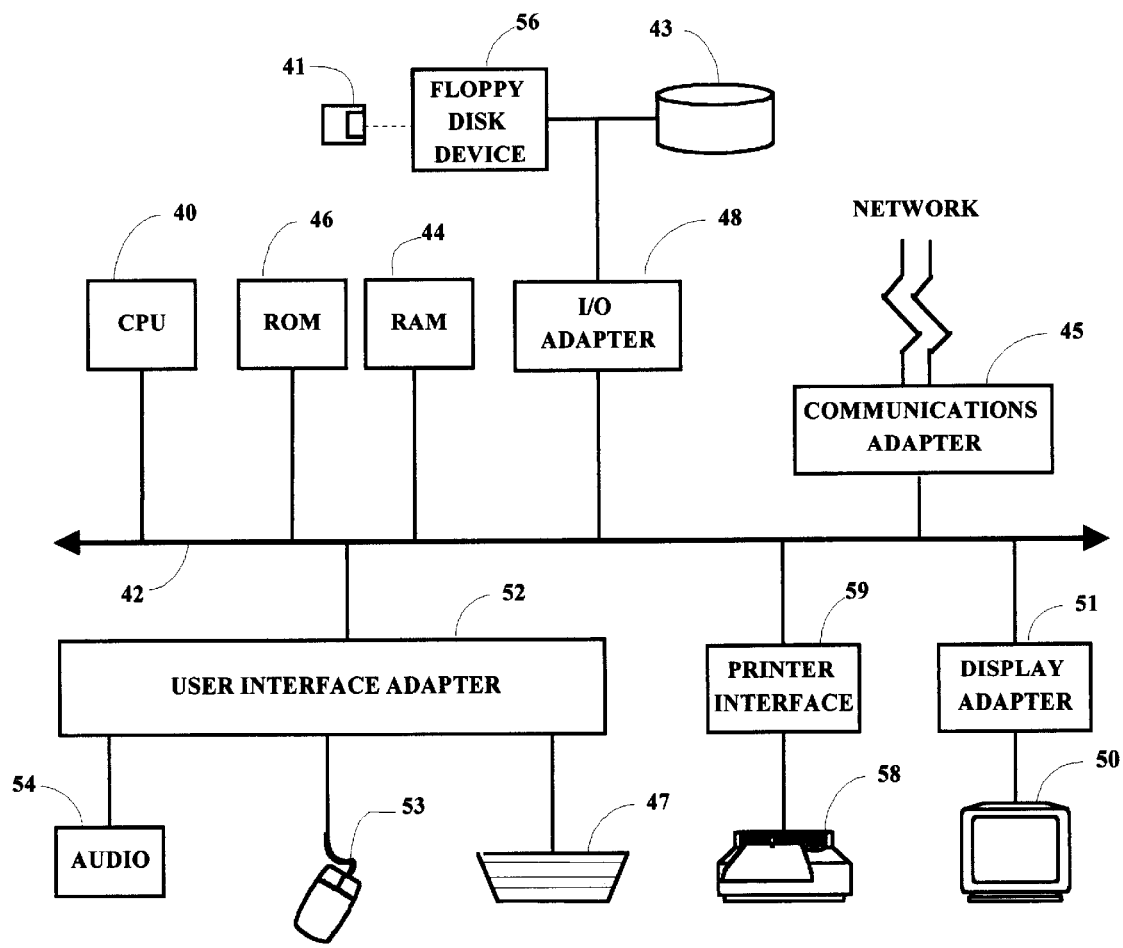
FIG. 2 is a schematic block diagram of a computer/workstation within the distributed information processing system shown in FIG. 1.

Referring to FIG. 2, there is shown a pictorial representation of a workstation having a central processing unit (CPU) 40 such as a conventional microprocessor, and a number of other units interconnected via a system bus 42. The exemplary workstation shown in FIG. 2 further includes a Random Access Memory (RAM) 44, a Read-Only Memory (ROM) 46, an input/output (I/O) adapter 48 for connecting peripheral devices such as storage unit 43 and floppy disk device 56 to the bus 42. A user interface adapter 52 is shown connecting a keyboard 47, a mouse 53 and an audio system 54 (which may include speakers and microphones) to the bus 42. Other devices such as a touchscreen input device (not shown) may also be connected to the bus 42 through the user interface adapter 52. A communications adapter 45 is shown in the example connecting the bus 42 to one or more networks, and a display adapter 51 connects a display device 50 to the main bus 42. The computer software embodiment of the present invention may be included as a software toolkit installed on one of the workstations within the distributed environment illustrated. One skilled in the art will appreciate that the procedures associated with the present invention may be in the form of a computer program product on a computer readable medium, which may be temporarily or permanently loaded on the illustrated workstation in disk storage 43, floppy disk 41 or RAM 44.

Figure 3:
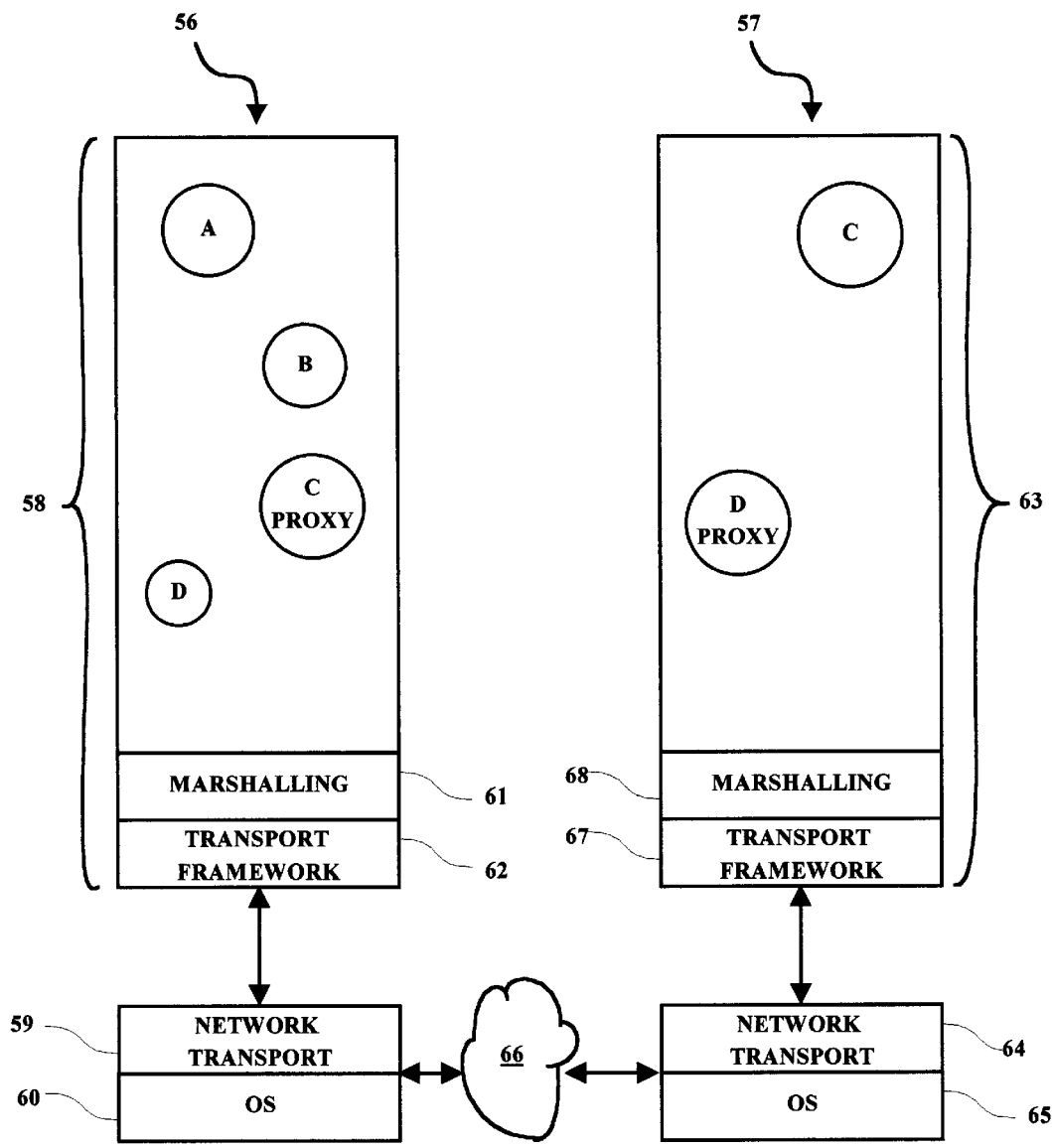
FIG. 3 is a pictorial representation of an exemplary generalized software configuration of two nodes within a heterogeneous distributed object-oriented computing environment.

In FIG. 3, there is illustrated a generalized software configuration of two nodes 56 and 57 within a heterogeneous. distributed computing environment such as an information processing system. As illustrated, nodes 56 and 57, which can comprise two of computers 12 within information processing system, execute software under the control of possibly diverse operating systems 60 and 65, respectively. Although diverse operating systems may be utilized by nodes 56 and 57, intercommunication between nodes 56 and 57 via network 66 is facilitated by network transport layers 59 and 64, which can comprise Transport Control Protocol/Interface Program (TCP/IP), for example. The software configuration of nodes 56 and 57 further comprise a distributed object environment 58 and 63, including software objects A, B, C and D. To illustrate the interaction of objects A–D within distributed object environment 58 and 63, assume that object A invokes a method on objects B and C, passing object D as a parameter, and that objects B and C belong to the same class. If object A calls object B, a local object, all of the interaction between objects A, B and D occurs within the same local process and is controlled strictly by the dispatching and reference mechanisms of the local process. On the other hand, if object A calls object C, with C being a remote object, the call is directed to object C proxy, which interacts with marshalling code 61 and transport framework 62 to package the call parameters into a message having a format suitable for transmission over network 66. In response to receipt of the message at node 57, network transport 64 passes the message to transport framework 67 and marshalling code 68, which de-marshals the parameters to re-construct the call of object C. Thereafter, an object D proxy is created and object C is called in the same manner as if object C were local to object A. Any requests from object C to object D are similarly handled through object D proxy. As can be seen from the above description of a distributed object environment, an object can transparently interact with other objects within the distributed object environment without regard to whether the other objects reside at a local or remote node or whether the objects are within the same process.

Figure 4:
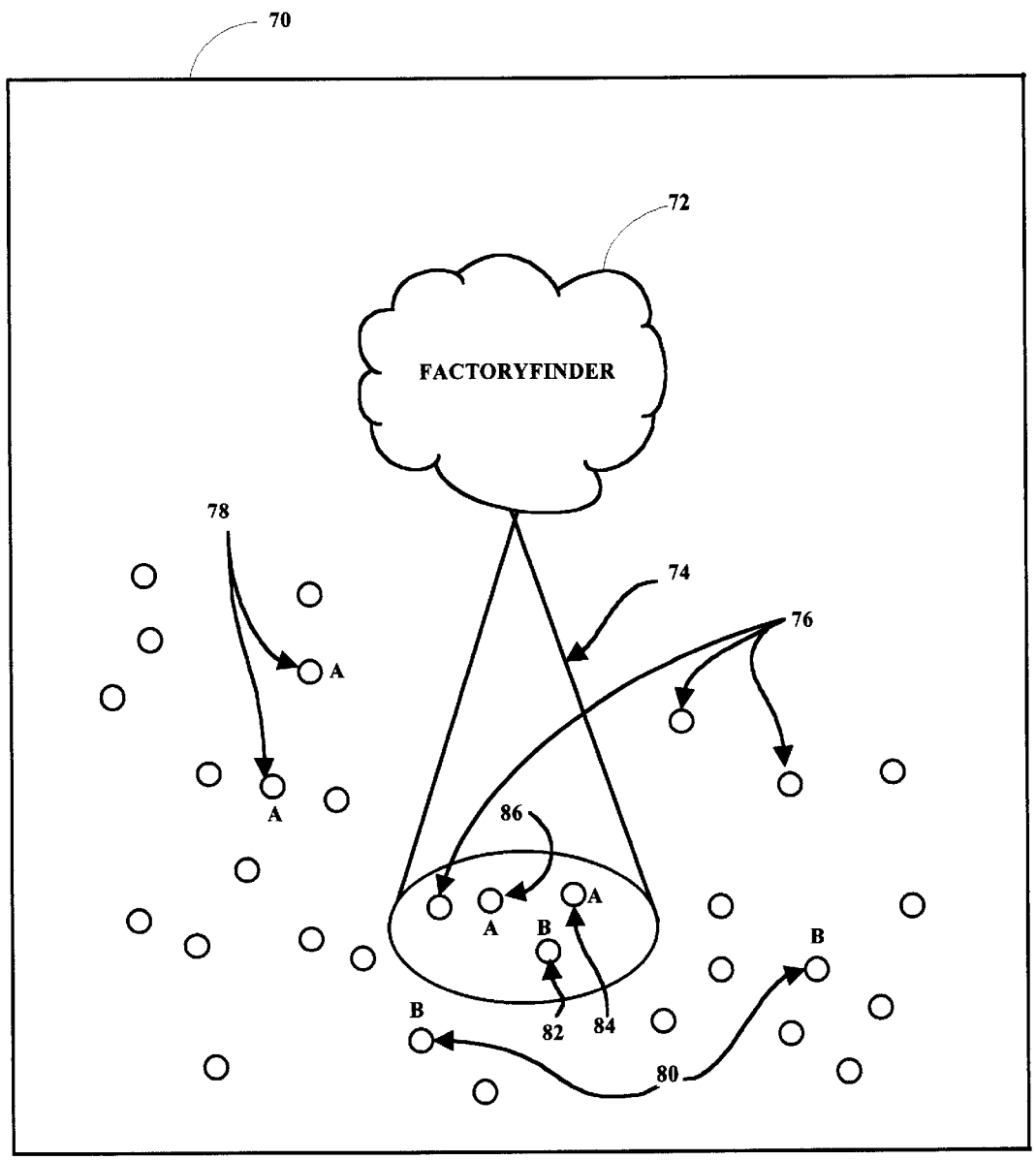
FIG. 4 is an illustration showing a FactoryFinder function within a distributed domain.

In FIG. 4, there is illustrated the Life Cycle Service Factory Finding as defined by the OMG and as implemented in the environment for the preferred embodiment. As illustrated, there is shown a representation of a FactoryFinder's scope as defined by the OMG Life Cycle Service. A distributed domain 70 contains factory objects 76 which are used for creating objects within the domain. These factory objects create objects of different types, such as type A objects 78, 84, 86 and type B objects 80, 82. The distributed domain 70 also contains a FactoryFinder object 72 which is capable of finding factories within a particular scope 74 of the distributed domain 70. CORBA FactoryFinders are configured so as to only consider a portion of the entire distributed environment when looking for a factory. Thus, the FactoryFinder defines "where" to look. When a FactoryFinder 72 processes a client request, it is the client that tells the FactoryFinder 72 what to look for within its scope 74. For example, if FactoryFinder 72 was asked to find a factory of A objects 78, 84, and 86, the FactoryFinder 72 would return one of the factories for A objects 84, 86 within its scope 74 but would not return the factory for A object 78 which is outside of the scope 74 of the FactoryFinder 72. Thus, a FactoryFinder 72 encapsulates "where" to look in the distributed domain 70 and the client's request defines "what" the FactoryFinder 72 should look for.

Furthermore the FactoryFinder scope may be defined as a single logical location, for example resources of a specified application server, or may be defined as an ordered sequence of locations, in which each location is searched in turn until a factory is found or all locations have been searched. The two cases are differentiated by using the terms "single location FactoryFinder" and "ordered location FactoryFinder", respectively.

Within the preferred embodiment of this invention, single location FactoryFinders can be configured to look for factories within a particular server process on a particular host, in any server process on a particular host, in any server process within a workgroup (a logical grouping of hosts) or within any server process in a cell (all the hosts within an administrative domain). In addition, there are ordered location FactoryFinders which can find, for example, a factory that is "nearest" to the requester, such that it will look first for a factory in a particular server process, and if not found then look for it on all server processes on the same host, and if not found then look for it on all server processes in the same workgroup and finally, if still not found, it will look for it on all server processes in the same cell.

Referring again to FIG. 4, client requests to FactoryFinder 72 can be further qualified than just asking for a factory for a particular object type. For example, if the factories for A objects 84, 86 were to have some different attribute, such as their underlying implementation class, a request to FactoryFinder 72 could be made that differentiated between the two. A request for a factory that created A objects whose implementation class was "AImpl86" would return the factory 86 but not the factory 84. The following are the parameters that the client would pass to the FactoryFinder for the unqualified request:
A.object interface
and for the qualified request:
A.object interface/AImpl86.object implementation Prior to the present invention, the collections for which the Query Service would be looking, both homes and non-homes, would be looked-up by using the Naming Service. The Query Service would only work with collections that were on the same server as the QueryEvaluator. The collections would be bound into the Name Space using the name:
cell/hosts/<hostname>/resources/servers/<servername>/collect ions/<collectionname>
where <hostname>, <servername> and <collectionname> contain the name of the host, the name of the server process and the simple name of the collection. The QueryEvaluator would determine the name of the host and the server in which it was running and would obtain the name of the collection from the SQL statement, thus being able to construct the name used to obtain the object reference from the Naming Service.

One last thing within the environment of the preferred embodiment needs to be looked at prior to description of the specific invention. Home objects are automatically placed into the Life Cycle Service for location by FactoryFinders at the server, host, workgroup and cell levels. The information about each home object contains information such as the type of object it creates, the implementation name of the objects, a factory name given to the home, etc. Homes are also automatically placed in the Name Space at the location described above where QueryEvaluators will be looking for them (i.e. on the local host in a server with a specific name) using the simple name expected to be used in the SQL statement. Collections which are not homes are not automatically placed into the Name Space but would need to be put there by an administrator setting up the environment. These collections can only be found by QueryEvaluators and not by FactoryFinders.

The following discussion addresses specifically how to utilize the Life Cycle Service for finding queriable collections in a distributed environment when Life Cycle identifies factories by interface name of the objects they create and Query identifies collections using a simple collection name. Some collections which the Query Service needs to find are not factories, and are therefore not known to Life Cycle. The solution can't require the SQL passed to the Query Service to be modified by the calling programs.

The following disclosure involves (1) providing enhancements to Life Cycle to store a mapping from simple names (used by Query to identify collections) to the parameters required by Life Cycle for finding those homes; (2) providing a way to make known to Life Cycle the queriable collections which are not also homes; (3) providing a mechanism for Query to request Life Cycle to find a collection by simple name; (4) providing a methodology in Life Cycle which searches the distributed object oriented environment for both home and non-home collections by simple name, utilizing as much as possible the already existing methodologies for finding homes.

The first step is to enhance Life Cycle to store a mapping from simple names to the parameters required by Life Cycle for finding those homes. As was previously mentioned, homes in the preferred embodiment are automatically registered with Life Cycle and are also bound into the name space. The enhancement is simply to take the name used to bind the home into the name space and provide that name to Life Cycle. The Life Cycle Service then generates a mapping from that name to the parameters that would be used to find a home that creates objects of that type. For example, if the simple name for a home that created Policy objects was PolicyHome, the Life Cycle Service would store information that mapped the name PolicyHome to the parameter value:
"Policy.object interface/PolicyObjectFactory.object home".

Now, given the simple name PolicyHome, the Life Cycle Service could search for the factory as if it had been requested to find a factory using the parameter Policy.object interface/PolicyObjectFactory.object home.

The next step is to make known to Life Cycle the queriable collections which are not also homes. To do this, there needs to be pre-defined locations in the name space from which the collection name can be used in a Naming resolve operation to locate a reference to the collection object. These pre-defined locations are distinguished roots from which the collection name is used as a relative name. There needs to be a distinguished root for each scope within which the collection could be looked for. This could be done for a collection in a specific server process by binding the collection into the distinguished root for the server, such as: "cell/hosts/<hostname>/resources/servers/<servername>/ collections/<collectionname>".

To also make this possible at other scopes (e.g. host, workgroup and cell), the following distinguished roots were added so that collection names could be bound as:
cell/hosts/<hostname>/resources/collections/ <collectionname>
cell/workgroups/<workgroupname>/resources/collections/ <collectionname>
cell/resources/collections/<collectionname>

The third step is to provide a mechanism for a QueryEvaluator to request Life Cycle to find a collection by simple name. This is accomplished by enhancement to the FactoryFinder to accept a find_factory request with the parameter:
<collectionname>.collection Finally, the FactoryFinder has an enhanced methodology which searches the distributed object oriented environment for both home and non-home collections by simple name, utilizing as much as possible the already existing methodology for finding homes. Remember that FactoryFinders are configured to search the distributed environment within a particular scope. Given a particular single location scope, the simplest expression of the methodology is expressed in the following pseudo-code:

If the <collectionname> is translatable to a FactoryFinder parameter
    use parameter and typical Life Cycle factory finding
else
    do naming resolve to appropriate context for scope ( . . . collections/<collectionname>)

Figure 7:
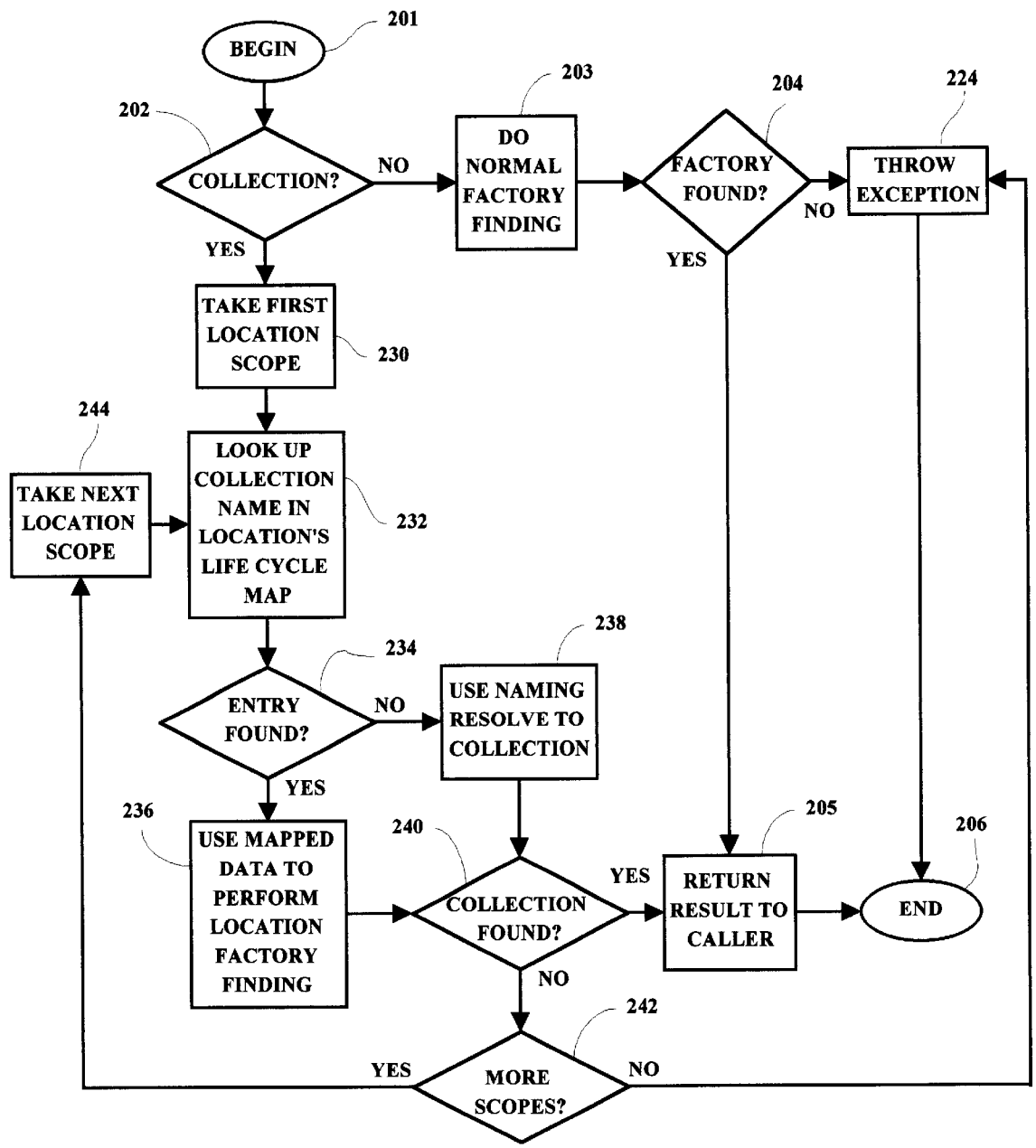
FIG. 7 is a flow chart illustrating an exemplary processing methodology implementing another embodiment of the present invention.

As shown in FIG. 7, this methodology is extendable to ordered location FactoryFinders which search multiple locations in the distributed domain. The methodology begins 201 with a call to a FactoryFinder to find a factory. The FactoryFinder determines 202 if the parameters of the call indicate that this is a special collection-based request. If it is not, then normal factory finding processing is done 203. If a factory is found 204, it is returned 205 to the caller. If a factory is not found 204, an exception is thrown 224. In either case the processing is finished 206.

When the request is a special collection-based request, the FactoryFinder looks at the first location scope 230 and looks in the Life Cycle Service map at this scope for the collection name 232. If the collection name is found 234 then the collection must be a Home and the Life Cycle Service parameters from the map are used to perform normal single location factory finding at this scope 236; or if not found 234, then the collection is probably a non-Home and the FactoryFinder tries to resolve the name directly with the Naming Service 238 using a NameContext appropriate for the scope. If the collection is found 240 from either of these two methods, it is returned to the caller 205 and processing ends 206. If it is not found 240 by either of these two methods, and there are more location scopes to search 242, the FactoryFinder takes the next scope 244 and repeats the procedure starting at step 232. If it is not found 240, and all location scopes have been searched 242, then an exception is thrown 224 and processing ends 206.

In the preferred embodiment of this invention, the Query Service searches for the collection which is the nearest to the query evaluator by using an ordered location FactoryFinder which looks first at server scope, then host, then workgroup and then cell. With this particular FactoryFinder, the resulting search methodology is shown in FIG. 5.

Figure 5:
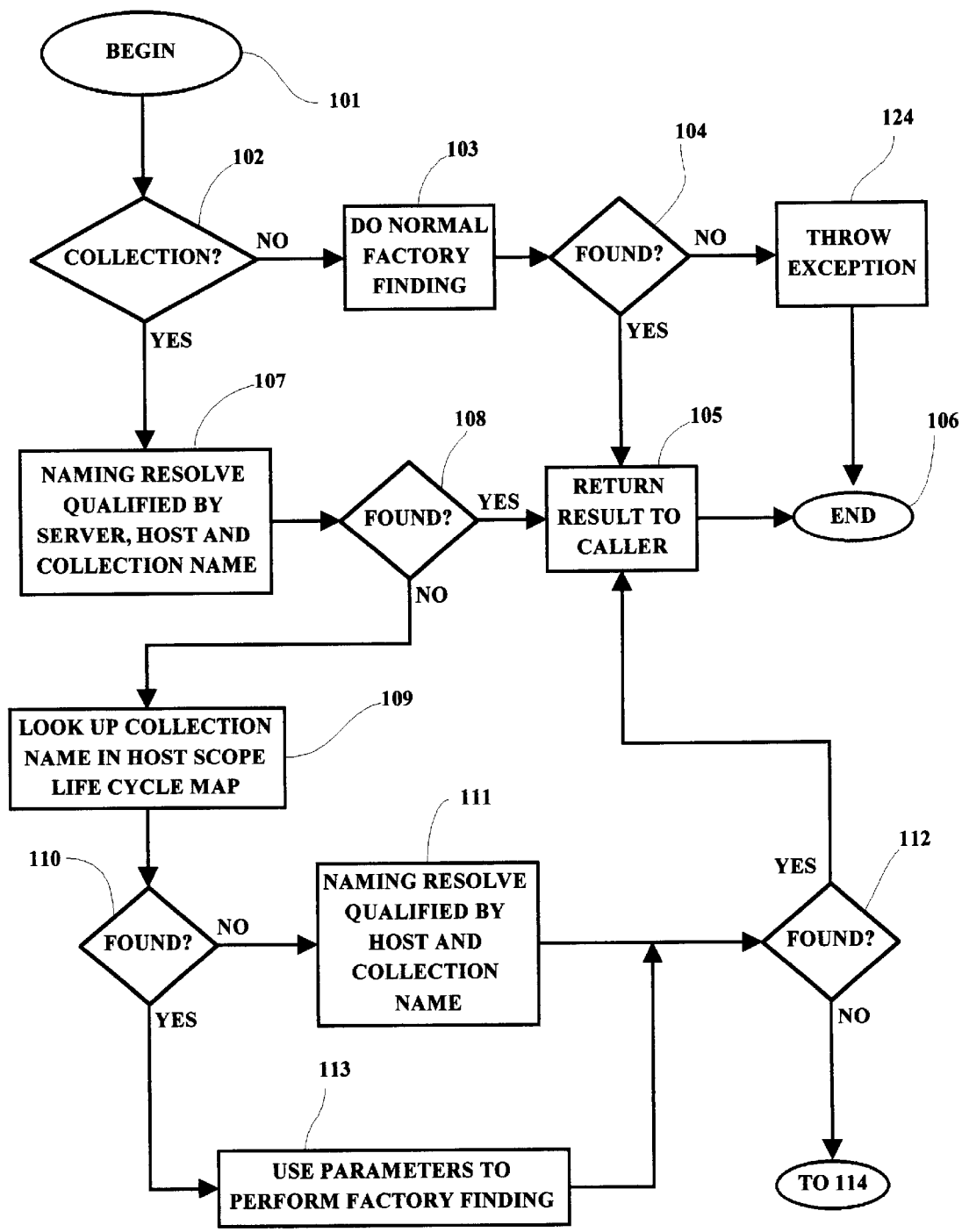
FIG. 5 is a flow chart illustrating an exemplary processing methodology implementing the present invention.
Figure 6:
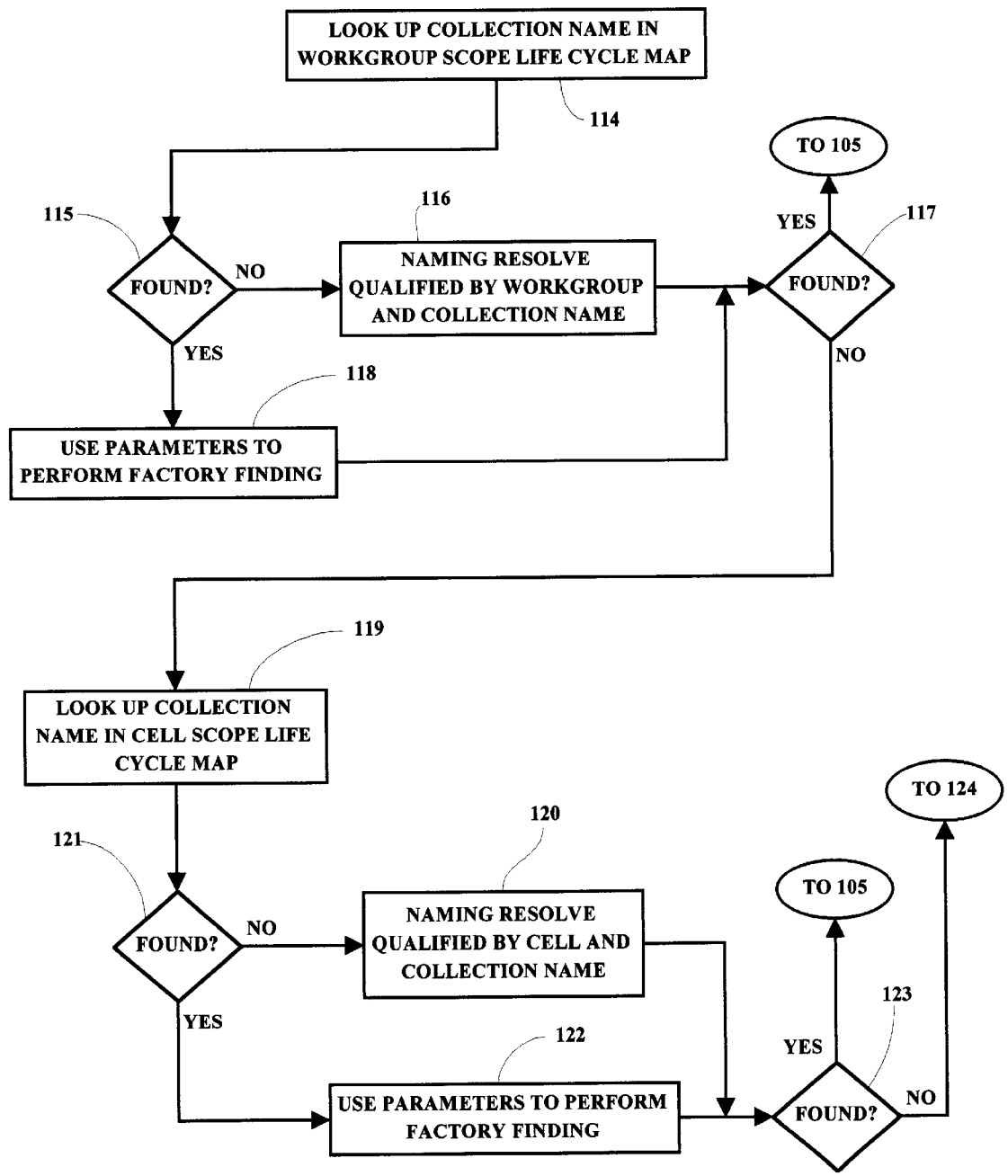
FIG. 6 is a continuation of FIG. 5.

As shown in FIG. 5, the methodology begins 101 with a call to the FactoryFinder to find a factory. The FactoryFinder determines if the parameter of the call is one of the special <collectionname>.collection parameters 102. If not, normal factory finding processing is done 103 and if a factory is found 104 it is returned 105 to the caller, and if it is not found 104, an exception is thrown 124 and in either case the processing is finished 106. If the parameter was determined to be one of the special <collectionname>.collection 102 parameters, the FactoryFinder calls the Name Service 107 using the name:
"cell/hosts/<hostname>/resources/servers/<servername>/ collections/<collectionname>".

In this case, when the scope identifies a specific server, the resolve to the name space and FactoryFinder processing are redundant since nameAsHome is known to be unique. It can therefore be collapsed into just doing the resolve. This is a significant performance improvement as NameService resolves are faster than LifeCycle factory finding. At all higher levels (e.g. host, workgroup, cell), both the resolve and the normal factory finder processing might be needed because nameAsHome cannot be guaranteed to be unique at this scope. If the collection name is found to indeed be a nameAsHome value (i.e. the interfacename/nameAsFactory can be found in the Life Cycle data), then factory finding will be used. If not, then it must be a shortname for a non-home collection, and therefore normal resolve processing is accomplished.

If the collection is found 108 it is returned to the caller 105 and processing ends 106, whereas if it is not found 108, an attempt is made to translate the collection name into FactoryFinder parameters 109 at the host scope. If found 110, that means the collection must be a home, so the parameters are used to do normal Life Cycle factory finding 113; or if not found 110, the collection is probably a non-home and the FactoryFinder calls the Naming Service 111 using the name "cell/hosts/<hostname>/resources/collections/ <collectionname>".

If the collection is found 112 from either of these two methods, it is returned to the caller 105 and processing ends 106. If it is not found 112 by either of these two methods, an attempt is made to translate the collection name into FactoryFinder parameters 114 at the workgroup scope. If found 115, that means the collection must be a home, so the parameters are used to do normal Life Cycle factory finding 118; or if not found 115, the collection is probably a nonhome and the FactoryFinder calls the Name Service 116 using the name:
"cell/workgroups/<workgroupname>/resources/ collections/<collectionname>".

If the collection is found 117 from either of these two methods, it is returned to the caller 105 and processing ends 106. If it is not found 117 by either of these two methods, an attempt is made to translate the collection name into FactoryFinder parameters 119 at the cell scope. If found 121, that means the collection must be a home, so the parameters are used to do normal Life Cycle factory finding 122; or if not found 121, the collection is probably a nonhome and the FactoryFinder calls the Name Service 120 using the name: "cell/resources/collections/<collectionname>".

If the collection is found 123 from either of these two methods, it is returned to the caller 105 and processing ends 106. If it is not found 123 by either of these two methods an exception is thrown 124 and processing ends 106.

In the above example, it is noted that the parameter to the FactoryFinder is not "<interfacename>.object interface", but rather is "<interfacename>.object interface/<homename>.object home". In this case, the value for <homename>.object is not the same as the simple homename used by the Query Service. As described previously, the simple name used by the Query service in the SQL might be something like PolicyHome whereas the <homename> as known to the Life Cycle Service might be something like PolicyObjectFactory. In the configuration of the home, the name used by Query is referred to as "nameAsHome" and the name used by Life Cycle is referred to as "nameAsFactory". By including the nameAsFactory in the parameters used to do normal factory finding processing, Life Cycle can ensure that it finds the correct home in the case where there are multiple implementations of the same interface within the distributed environment.

In addition to the above description of an extended FactoryFinder methodology for locating collections in the distributed domain, it is also possible to envisage an alternative design approach in which similar logic is used directly by the Query Service. However, it is noted that delegating this logic to the FactoryFinder offers a number of advantages. Firstly, the need to maintain and persistently store a map from simple collection name to the appropriate Life Cycle parameters is a consistent extension of the Life Cycle Service role. Secondly, the encapsulation of the location-aware search logic within a FactoryFinder protects the Query Service from the complexities of the distributed domain. In the preferred embodiment of the invention, the implementations of the Naming Service and Life Cycle Service are co-located in the same server, which is a different server from where the QueryEvaluator is running. Therefore, with the disclosed implementation, a single call from the QueryEvaluator to the FactoryFinder flows remotely between the servers, with the FactoryFinder then able to make local calls to the Naming Service. If the search function had been implemented directly in the Query Service, the number of remote calls required would have greatly increased.

The method and apparatus of the present invention has been described in connection with a preferred embodiment as disclosed herein. The disclosed methodology may be implemented in many different ways in order to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented partially or totally in program code stored on one of many possible media carriers, or other memory device, from which it may be accessed and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for using Life Cycle Service for finding a named collection in a distributed network environment, said method comprising:

provided a mapping from named collections to parameters required by Life Cycle Service for finding corresponding named collections;

receiving a request to find a named collection using a designated name;

looking-up factory finder parameters related to said designated name by using said mapping; and performing a factory finding function to find said named collection.

2. The method as set forth in claim 1 wherein said designated name is a simple name.

3. The method as set forth in claim 1 wherein said method further includes:

using a naming function to resolve said designated name, said use of said naming function being performed only if said looking-up fails to find said factory finder parameters.

4. The method as set forth in claim 1 wherein said looking-up uses a data mapping table associated with a defined scope in said distributed network environment.

5. The method as set forth in claim 4 wherein said defined scope comprises a host device.

6. The method as set forth in claim 4 wherein said defined scope comprises a server process.

7. The method as set forth in claim 4 wherein said defined scope comprises a workgroup.

8. The method as set forth in claim 4 wherein said defined scope comprises a cell.

9. The method as set forth in claim 3 wherein said use of said naming function resolves using a relative name from a distinguished root in a name space.

10. The method as set forth in claim 9 wherein said distinguished root in said name space is determined according to a defined scope in the distributed domain.

11. The method as set forth in claim 10 wherein said defined scope comprises a host device.

12. The method as set forth in claim 10 wherein said defined scope comprises a server process.

13. The method as set forth in claim 10 wherein said defined scope comprises a workgroup.

14. The method as set forth in claim 10 wherein said defined scope comprises a cell.

15. The method as set forth in claim 3 wherein said looking up, performing and using are accomplished on an iterative basis through a sequence of defined scopes.

16. The method as set forth in claim 15 wherein said sequence of defined scopes comprises, in order, server, host, workgroup, and cell.

17. The method as set forth in claim 1 wherein said request is received as an IIOP message to a server.

18. The method as set forth in claim 2 wherein said request is processed by an object supporting a CosLifeCycle::FactoryFinder interface.

19. A storage medium including machine readable coded indicia, said storage medium being selectively coupled to a reading device, said reading device being selectively coupled to processing circuitry, said reading device being selectively operable to read said machine readable coded indicia and provide program signals representative thereof, said program signals being effective for using Life Cycle Service for finding a named collection in a distributed network environment, said program signals being selectively operable to accomplish the steps of:

providing a mapping from named collections to parameters required by Life Cycle Service for finding corresponding named collections;

receiving a request to find a named collection using a designated name;

looking-up factory finder parameters related to said designated name by using said mapping; and performing a factory finding function to find said named collection.

20. A distributed network information processing system comprising:
- a server device;
- at least one terminal; and
- a network connection arranged to selectively couple said terminal and said server, said server being responsive to a receipt of a request from said terminal for a named collection to look-up factory finder parameters for said named collection by using a mapping from named collections to parameters required by Life Cycle Service for finding corresponding named collections and to accomplish a factory finding function to find said named collection.

\* \* \* \* \*